US012265360B2

(12) United States Patent
Kawanishi et al.

(10) Patent No.: US 12,265,360 B2
(45) Date of Patent: Apr. 1, 2025

(54) TIMEPIECE COMPONENT AND TIMEPIECE

(71) Applicant: Seiko Epson Corporation, Tokyo (JP)

(72) Inventors: Kazushi Kawanishi, Shiojiri (JP); Saki Ogawa, Nasushiobara (JP)

(73) Assignee: SEIKO EPSON CORPORATION (JP)

( * ) Notice: Subject to any disclaimer, the term of this patent is extended or adjusted under 35 U.S.C. 154(b) by 545 days.

(21) Appl. No.: 17/693,707

(22) Filed: Mar. 14, 2022

(65) Prior Publication Data

US 2022/0291633 A1 Sep. 15, 2022

(30) Foreign Application Priority Data

Mar. 15, 2021 (JP) ................................ 2021-041087

(51) Int. Cl.
*G04B 29/02* (2006.01)
*G04B 45/00* (2006.01)

(52) U.S. Cl.
CPC ....... *G04B 29/022* (2013.01); *G04B 45/0015* (2013.01)

(58) Field of Classification Search
CPC .... G04B 29/022; G04B 45/0015; A44B 1/04; A44C 3/004; A44C 3/005; A44C 21/00
USPC .................................. 428/30, 28, 66.5, 167
See application file for complete search history.

(56) References Cited

U.S. PATENT DOCUMENTS

| | | | | | |
|---|---|---|---|---|---|
| 4,034,555 | A * | 7/1977 | Rosenthal | G04B 45/0015 | 968/383 |
| 4,050,236 | A * | 9/1977 | Jauch | G04B 45/0053 | 968/388 |
| 4,541,727 | A * | 9/1985 | Rosenthal | G04B 45/0015 | 968/383 |
| 9,677,838 | B2 * | 6/2017 | Faxon | F41A 21/482 | |
| 2003/0170487 | A1 * | 9/2003 | Miyama | B32B 15/017 | 428/685 |
| 2005/0265131 | A1 * | 12/2005 | Neumann | G04B 45/0069 | 368/276 |
| 2017/0060093 | A1 * | 3/2017 | Awano | G04C 10/02 | |
| 2017/0074612 | A1 * | 3/2017 | Faxon | F41A 21/482 | |
| 2021/0237421 | A1 * | 8/2021 | Luepke | B32B 27/12 | |

FOREIGN PATENT DOCUMENTS

| | | |
|---|---|---|
| JP | H07-098387 A | 4/1995 |
| JP | 2003-072293 A | 3/2003 |

* cited by examiner

*Primary Examiner* — Edwin A. Leon
*Assistant Examiner* — Sean R Brannon
(74) *Attorney, Agent, or Firm* — Harness, Dickey & Pierce, P.L.C.

(57) ABSTRACT

Provided is a timepiece component including a train wheel bridge, wherein the train wheel bridge includes a base material in which a first groove, a second groove, and a flat portion are formed along a first direction, in a second direction orthogonal to the first direction, the flat portion is provided between the first groove and the second groove, in the first direction, in the first groove and the second groove, a wide width portion and a narrow width portion are alternately provided, in the second direction, the wide width portion and the narrow width portion are alternately provided, and a depth of the wide width portion is deeper than a depth of the narrow width portion.

10 Claims, 11 Drawing Sheets

TIMEPIECE COMPONENT AND TIMEPIECE

The present application is based on, and claims priority from JP Application Ser. No. 2021-041087, filed Mar. 15, 2021, the disclosure of which is hereby incorporated by reference herein in its entirety.

BACKGROUND

1. Technical Field

The present disclosure relates to a timepiece component and a timepiece.

2. Related Art

There may be a case where, in order to enhance an appearance of a timepiece component, a pattern is formed on a front surface of the timepiece component. A timepiece component that has a front surface on which a boxwood pattern is formed is disclosed in JP-A-2003-72293. The boxwood pattern can be obtained by forming a plurality of circular patterns in a state where the plurality of circular patterns partially overlap with each other. As a result, the timepiece component exhibits an external appearance where the plurality of circular patterns are arranged. The circular patterns are formed by cutting grooves.

The boxwood pattern is formed by forming shallow cut lines on a front surface of a base material and hence, a viewer receives a planar impression. In order to provide a timepiece component having higher design property, there has been a demand for a timepiece component having a pattern, on a front surface thereof, that can impart a stereoscopic impression to clients.

SUMMARY

According to an aspect of the present disclosure, there is provided a timepiece component comprising a base material on which a first groove, a second groove, and a flat portion are formed along a first direction, wherein

- the flat portion is provided between the first groove and the second groove in a second direction orthogonal to the first direction,
- a first wide width portion and a first narrow width portion are alternately provided in the first groove in the first direction,
- a second wide width portion and a second narrow width portion are alternately provided in the second groove in the first direction, the first wide width portion and the second narrow width portion are alternately provided in the second direction, the first narrow width portion and the second wide width portion are alternately provided in the second direction, a width of the first wide width portion is wider than a width of the first narrow width portion, a width of the second wide width portion is wider than a width of the second narrow width portion, a depth of the first wide width portion is deeper than a depth of the first narrow width portion, and a depth of the second wide width portion is deeper than a depth of the second narrow width portion.

A timepiece includes the timepiece component described above.

The timepiece component includes the base material in which the first groove extending in the first direction is formed, in the first direction, the first wide width portion and the first narrow width portion are alternately provided in the first groove, the width of the first wide width portion is wider than the width of the first narrow width portion, the depth of the first wide width portion is deeper than the depth of the first narrow width portion, in cross section as viewed in the first direction, a cross-sectional shape of the first wide width portion and a cross-sectional shape of the first narrow width portion are formed in an arcuate shape having the same curvature.

The timepiece includes the timepiece component described above.

DESCRIPTION OF EXEMPLARY EMBODIMENTS

First Embodiment

Figure 1:
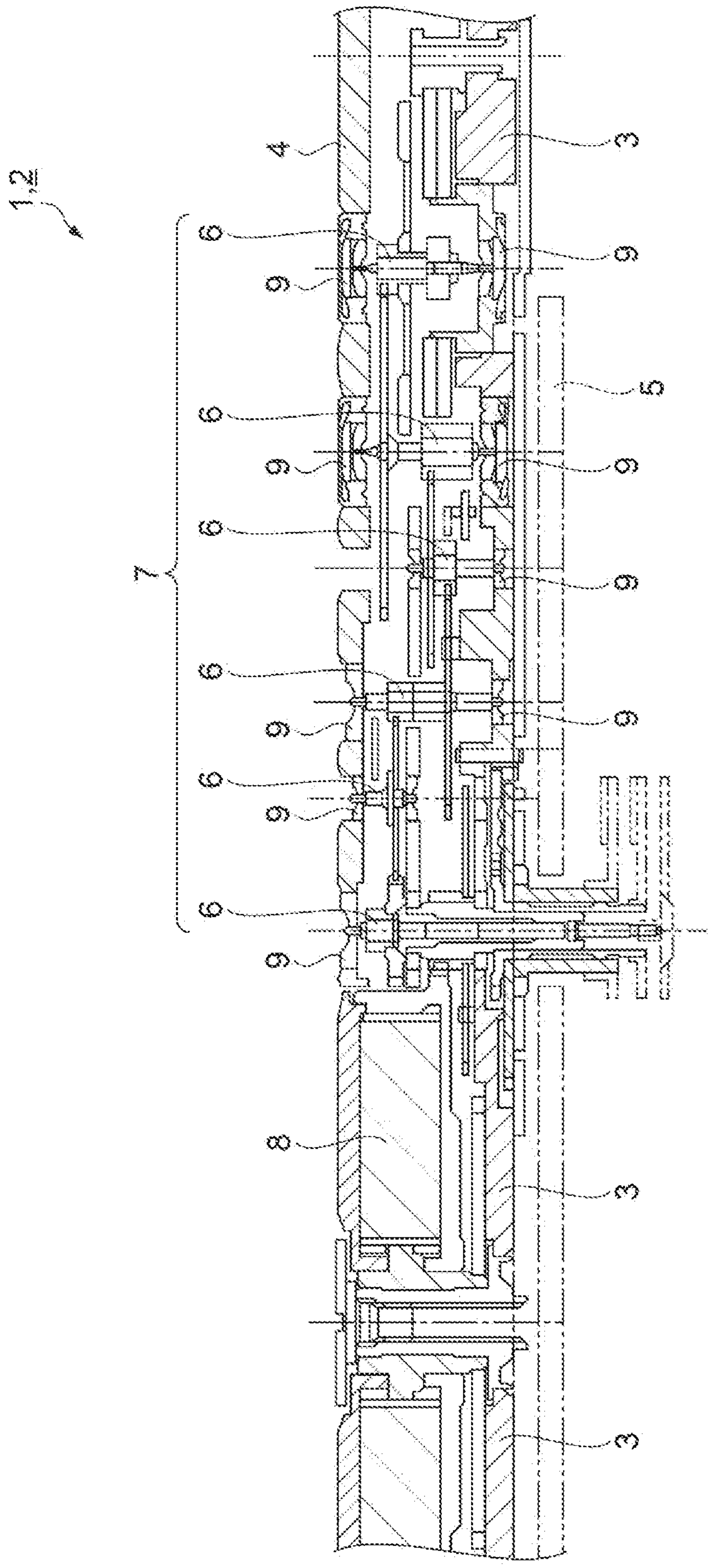
FIG. 1 is a schematic side cross-sectional view illustrating a configuration of a movement according to a first embodiment.

In the present embodiment, a typical example of a timepiece is described with reference to drawings. As shown in FIG. 1, a movement 2 incorporated in a timepiece 1 includes a main plate 3, and a train wheel bridge 4 as a timepiece component. The main plate 3 is disposed on a dial 5 side. The train wheel bridge 4 is disposed on a back lid (not illustrated in the drawing) side. The timepiece 1 may be an electronic timepiece or a mechanical timepiece. In the present embodiment, for example, the timepiece 1 is a mechanical timepiece. When the back lid includes a glass window, the train wheel bridge 4 can be viewed through the glass window. Accordingly, in a luxury timepiece, a pattern is formed on the train wheel bridge 4 by machining.

The main plate 3 and the train wheel bridge 4 are fixed to each other by screws via a support member not illustrated in the drawing. The main plate 3 and the train wheel bridge 4 are disposed with a predetermined distance therebetween. A train wheel 7 constituted of a plurality of gears 6 is disposed between the main plate 3 and the train wheel bridge 4. A barrel drum 8 is mounted on the main plate 3 in a rotatable manner by a screw. The barrel drum 8 is provided with a mainspring and supplies power for rotating the gears 6 of the train wheel 7 to the train wheel 7. The main plate 3 and the train wheel bridge 4 are respectively provided with bearings 9 for the gears 6.

Figure 2:
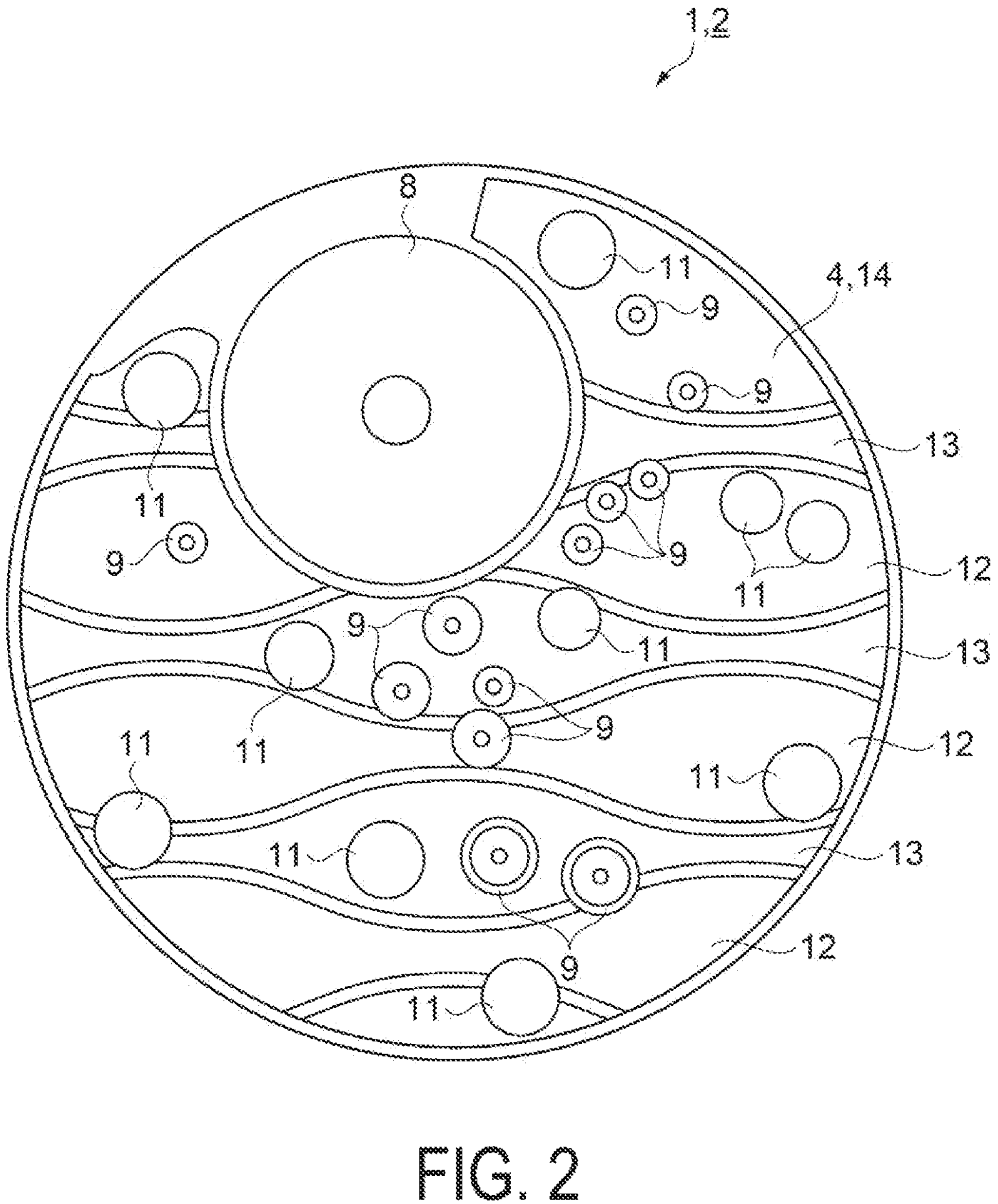
FIG. 2 is a schematic plan view illustrating an external appearance of a train wheel bridge.

As illustrated in FIG. 2, the train wheel bridge 4 includes a base material 14 on which a pattern is formed by first grooves 12 and second grooves 13. The large number of bearings 9 and the large number of screws 11 are disposed on the base material 14. The train wheel bridge 4 has a shape not overlapping with the barrel drum 8 as viewed in plan view. Here, the train wheel bridge 4 may have a shape overlapping with the barrel drum 8 as viewed in plan view.

Figure 3:
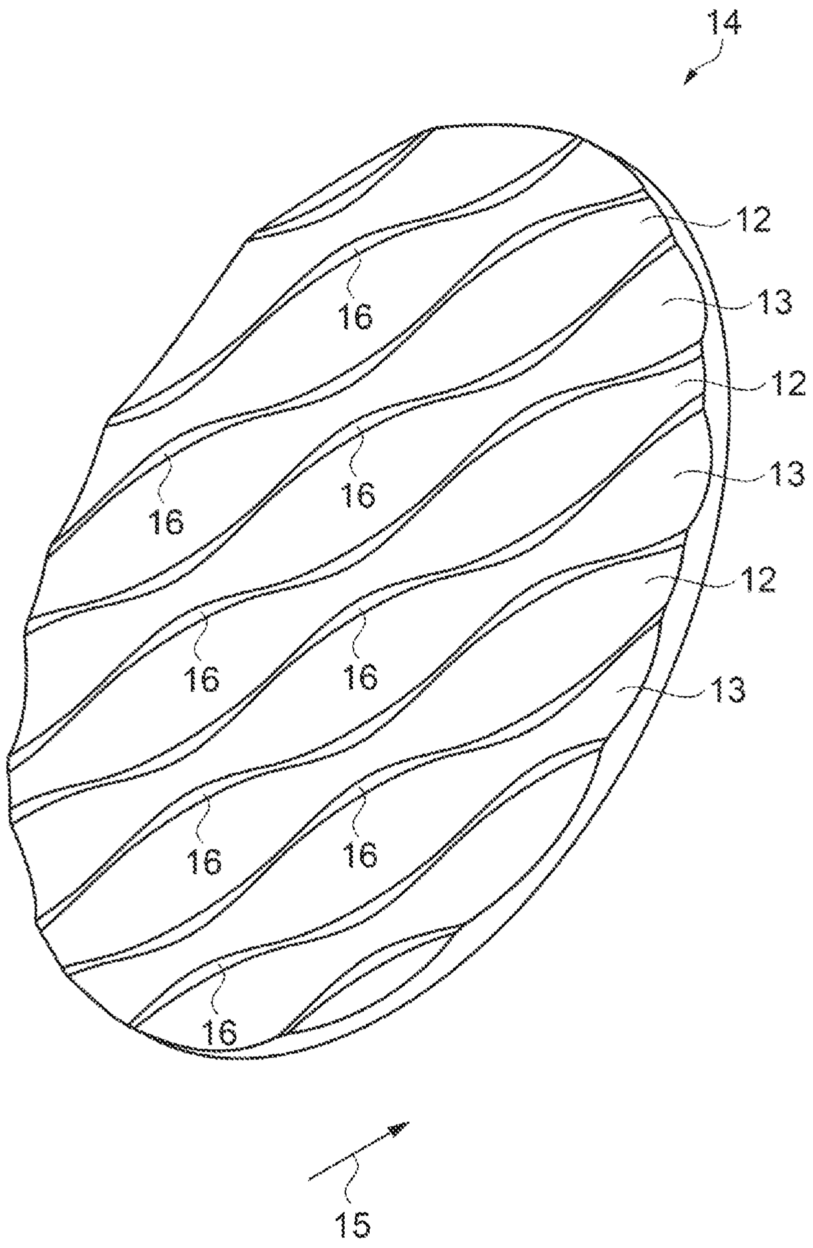
FIG. 3 is a schematic perspective view illustrating a pattern of the train wheel bridge.

Next, the pattern formed on the train wheel bridge 4 is described. In FIG. 3, a disc-shaped base material 14 on which the same pattern as the train wheel bridge 4 is formed is illustrated. The base material 14 is machined to have an outer shape including a portion where the barrel drum 8 is to be disposed. Further, the train wheel bridge 4 is formed by attaching the bearings 9 and the screws 11 to the base material 14.

The first grooves 12, the second grooves 13, and a flat portion 16 that each extend in a first direction 15 are formed on the base material 14. The first grooves 12 and the second grooves 13 are recessed in a cross-sectional direction with respect to the flat portion 16. To be more specific, the first grooves 12 and the second grooves 13 are arcuate grooves. With such a configuration, a linear pattern is formed on the base material 14 when the base material 14 is viewed obliquely.

Figure 4:
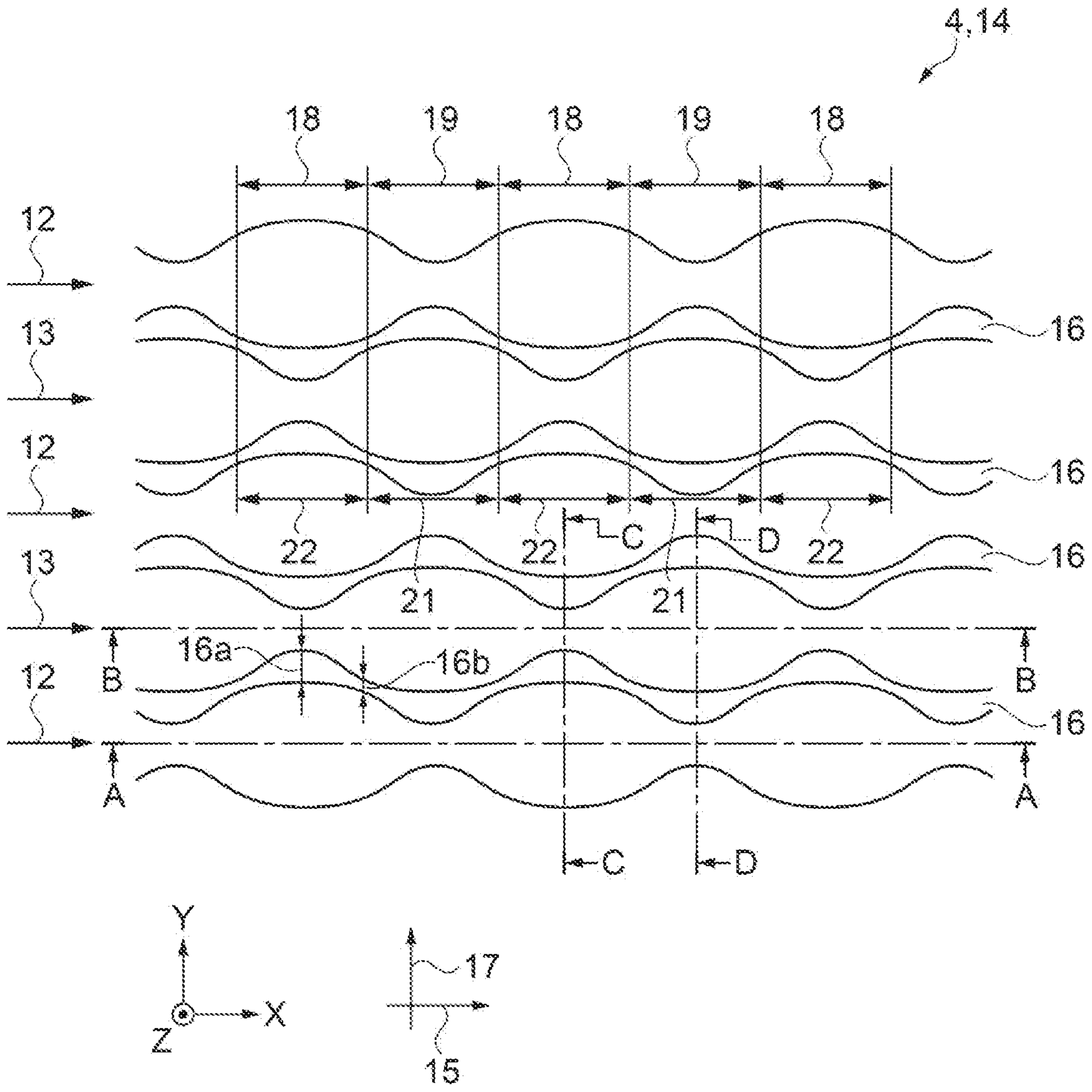
FIG. 4 is a schematic plan view of a main portion for describing the pattern of the train wheel bridge.

As illustrated in FIG. 4, in a second direction 17 orthogonal to the first direction 15, the flat portion 16 is provided between the first groove 12 and the second groove 13. In the first direction 15, first wide width portions 18 and first narrow width portions 19 are alternately provided to the first groove 12. A width of the first wide width portion 18 is wider than a width of the first narrow width portion 19. As viewed in plan view of the base material 14, side surfaces of a groove in the first wide width portion 18 each have a shape protruding in a direction away from a center line of the groove. As viewed in plan view of the base material 14, side surfaces of a groove in the first narrow width portion 19 each have a shape recessed in a direction approaching the center line of the groove. The contour of the first groove 12 in contact with the flat portion 16 is smoothly curved.

In FIG. 4 and succeeding drawings, the first direction 15 is assumed as an X axis direction, and the second direction 17 is assumed as a Y axis direction. A thickness direction of the base material 14 is assumed as a Z axis direction. In the first direction 15, second wide width portions 21 and second narrow width portions 22 are alternately provided to the second groove 13. A width of the second wide width portion 21 is wider than a width of the second narrow width portion 22. As viewed in plan view of the base material 14, the second groove 13 protrudes toward a flat portion 16 side in the second wide width portion 21. As viewed in plan view of the base material 14, the second groove 13 is narrowed in the second narrow width portion 22. The contour of the second groove 13 in contact with the flat portion 16 is smoothly curved.

In the second direction 17, the first wide width portions 18 and the second narrow width portions 22 are alternately provided. In the second direction 17, the first narrow width portions 19 and the second wide width portions 21 are alternately provided.

As viewed in plan view of the base material 14, the flat portion 16 is recessed in the first wide width portion 18. In the first narrow width portion 19, the flat portion 16 protrudes toward a first groove 12 side. In the second wide width portion 21, the flat portion 16 is recessed. In the second narrow portion 22, the flat portion 16 protrudes toward a second groove 13 side.

The contour of the first groove 12 and the contour of the second groove 13 in contact with the flat portion 16 are respectively formed of a plurality of continuous arcs.

As viewed in plan view of the base material 14, the flat portion 16 has wide width regions and narrow width regions with respect to a width in the second direction 17. In a region where the first wide width portions 18 and the second narrow width portion 22 are aligned in the second direction 17, a width of the flat portion 16 is assumed as a first width 16*a*. A width of the flat portion 16 in the second direction 17 between the first wide width portion 18 and the first narrow width portion 19 is assumed as a second width 16*b*. The first width 16*a* is wider than the second width 16*b*. According to such a configuration, the flat portion 16 has regions where a width in the second direction 17 is wide and regions where a width in the second direction 17 is narrow. Accordingly, compared to a case where the flat portion 16 is formed in a shape of a line having the same width, the shape of the flat portion 16 is rich in variety and hence, an aesthetic appearance of the base material 14 can be enhanced.

Figure 5:
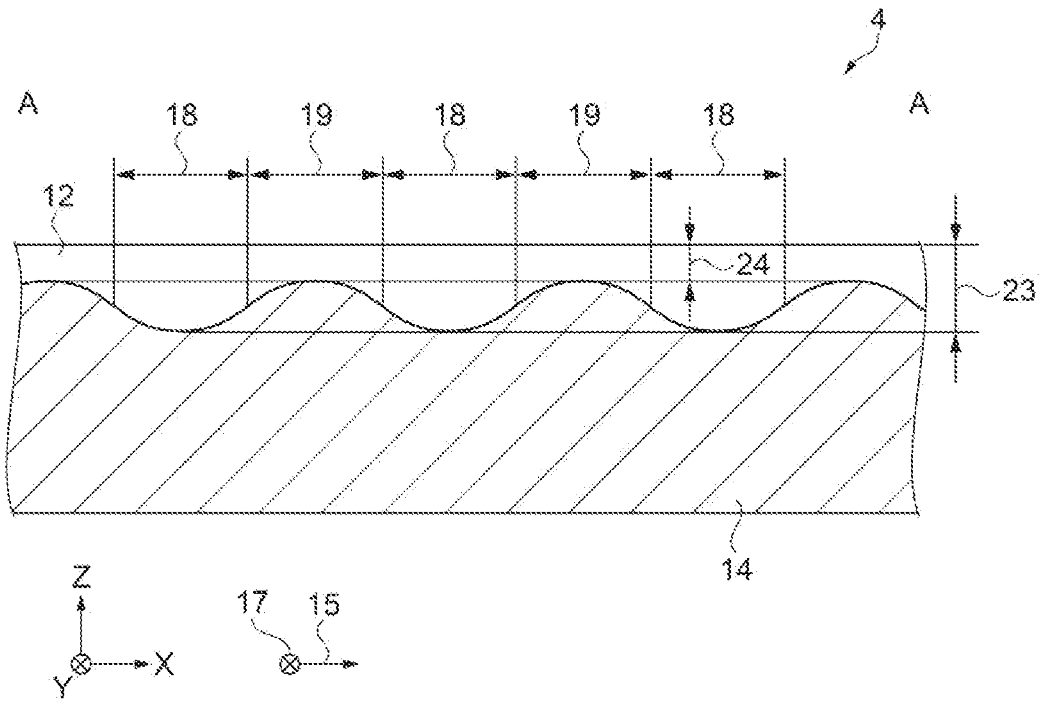
FIG. 5 is a schematic side cross-sectional view of a main portion for describing first grooves.

FIG. 5 is a view of the train wheel bridge 4 as viewed in cross section taken along a line A-A in FIG. 4. As illustrated in FIG. 5, a depth of the first wide width portion 18 in the first groove 12 is deeper than a depth of the first narrow width portion 19. The depth of the first groove 12 is deep at the first wide width portions 18 where the width of the first groove 12 is wide, and is shallow at the first narrow width portions 19 where the width of the first groove 12 is narrow.

The depth of the first groove 12 in the deepest region in the first wide width portion 18 is assumed as a first deep portion depth 23. The depth of the first groove 12 in the shallowest region in the first narrow width portion 19 is assumed as a second deep portion depth 24. The first deep portion depth 23 is equal to or less than 0.5 mm and is deeper than the second deep portion depth 24. The second deep portion depth 24 is shallower than the first deep portion depth 23, and is equal to or more than 0.05 mm. Accordingly, the depth of the first groove 12 is in a range of from 0.05 mm to 0.5 mm. Here, in order to further strengthen the stereoscopic impression by making the flat portion conspicuous, it is preferable that the depth of the first grooves 12 be in a range of from 0.1 mm to 0.5 mm. Further, in order to decrease a thickness of the timepiece component, it is preferable that the depth of the first groove 12 be in a range of from 0.05 mm to 0.3 mm. With such a configuration, the timepiece component can be light-weighted. Accordingly, it is possible to suppress deformation or breaking of the timepiece component against an impact that the timepiece component receives when the timepiece falls, for example.

Figure 6:
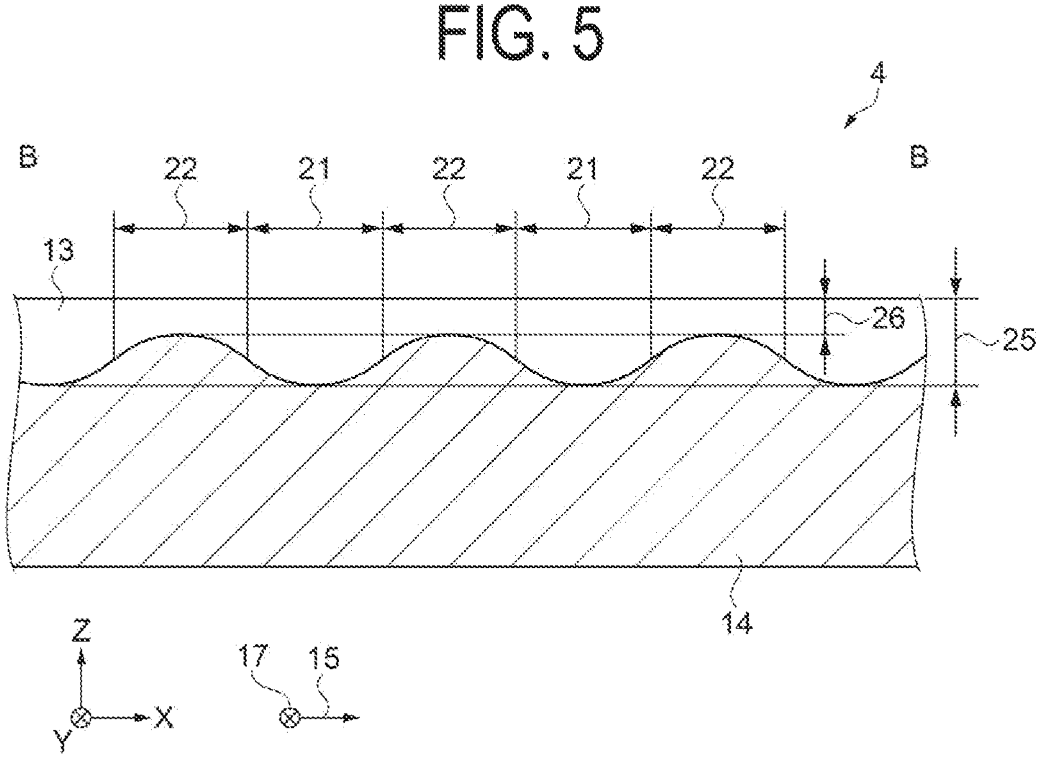
FIG. 6 is a schematic side cross-sectional view of a main portion for describing second grooves.

FIG. 6 is a view of the train wheel bridge 4 as viewed in cross section taken along a line B-B in FIG. 4. As illustrated in FIG. 6, the depth of the second wide width portion 21 in the second groove 13 is deeper than the depth of the second narrow width portion 22 in the second groove 13. The depth of the second groove 13 is deep at the second wide width portions 21 where the width of the second groove 13 is wide, and is shallow at the second narrow width portions 22 where the width of the second groove 13 is narrow.

The depth of the second groove 13 in the deepest region in the second wide width portion 21 is assumed as a third deep portion depth 25. The depth of the second groove 13 in the shallowest region in the second narrow width portion 22 is assumed as a fourth deep portion depth 26. The third deep portion depth 25 is equal to or less than 0.5 mm and is deeper than the fourth deep portion depth 26. The fourth deep portion depth 26 is shallower than the third deep portion depth 25, and is equal to or more than 0.05 mm. Accordingly, the depth of the second groove 13 is in a range of from 0.05 mm to 0.5 mm. Here, in order to further strengthen the stereoscopic impression by making the flat portion conspicuous, it is preferable that the depth of the second grooves 13 be in a range of from 0.1 mm to 0.5 mm. Further, in order to decrease the thickness of the timepiece component, it is preferable that the depth of the second groove 13 be in a range of from 0.05 mm to 0.3 mm. With such a configuration, the timepiece component can be light-weighted. Accordingly, it is possible to suppress deformation or breaking of the timepiece component against an impact that the timepiece component receives when the timepiece falls, for example.

With such a configuration, the first grooves 12 and the second grooves 13 are formed in a flat surface of the base material 14. In the first groove 12, the first wide width portions 18 where the groove width is wide and the groove depth is deep and the first narrow width portions 19 where the groove width is narrow and the groove width is shallow are alternately disposed. In the second groove 13, the second wide width portions 21 where the groove width is wide and the groove depth is deep and the second narrow width portions 22 where the groove width is narrow and the groove depth is shallow are alternately disposed. Accordingly, regions where the groove depth is deep and regions where the groove depth is shallow are alternately disposed in the first direction 15.

Also in the second direction 17, the first wide width portions 18 where the groove width is wide and the groove depth is deep and the second narrow width portions 22 where the groove width is narrow and the groove depth is shallow are alternately disposed. The second wide width portions 21 where the groove width is wide and the groove depth is deep and the first narrow width portions 19 where the groove width is narrow and the groove depth is shallow are alternately disposed. Accordingly, regions where the groove depth is deep and regions where the groove depth is shallow are alternately disposed both in a longitudinal direction and a transverse direction.

In the regions of both the first grooves 12 and the second grooves 13 where the groove depth is shallow, the flat portion 16 protrudes toward the groove side, and in the regions where the groove depth is deep, the groove protrudes toward the flat portion 16 side. A creative design of the base material 14 that provides a shape having unevenness and a change in groove depth, as viewed in plan view, imparts a stereoscopic impression to the front surface of the base material 14.

The depths of the first grooves 12 and the second grooves 13 are in a range of from 0.05 mm to 0.5 mm. With such a configuration, the depths of the first grooves 12 and the second grooves 13 are equal to or more than 0.05 mm. Accordingly, compared to the boxwood pattern formed of cutting marks having a depth of approximately 5 μm, the base material 14 has deeper grooves and hence, it is possible to impart a stereoscopic impression to the front surface of the base material 14. The depths of the grooves are equal to or less than 0.5 mm and hence, it is possible to suppress the increase of the thickness of the base material 14.

Figure 7:
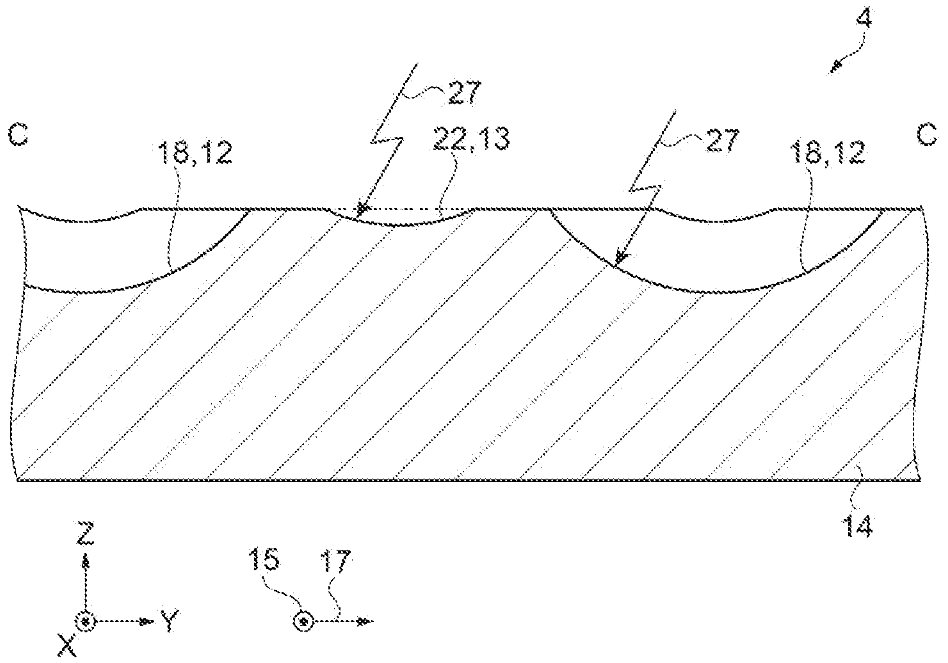
FIG. 7 is a schematic side cross-sectional view of a main portion for describing depths of grooves.
Figure 8:
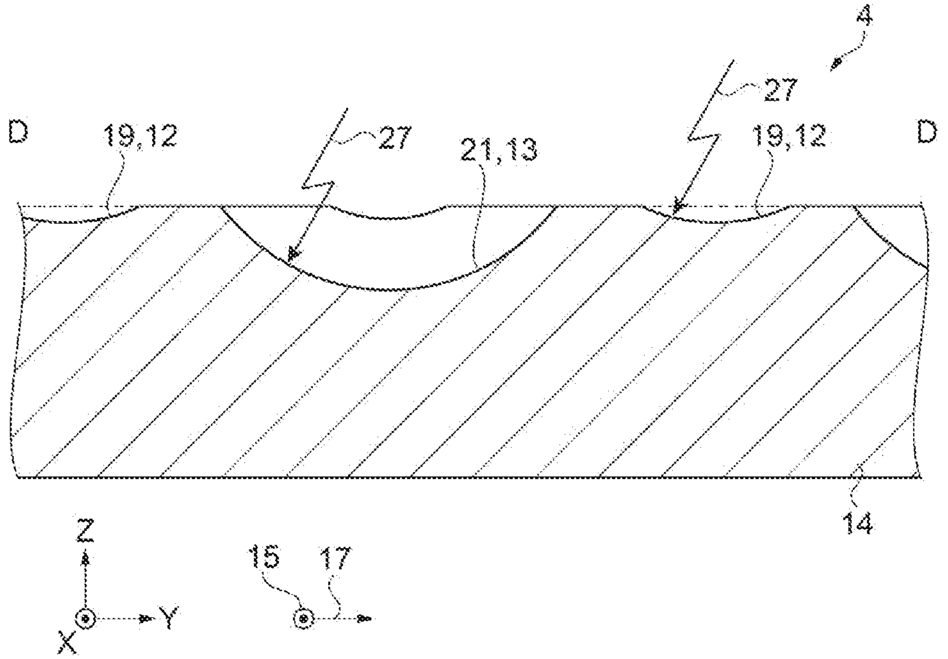
FIG. 8 is a schematic side cross-sectional view of a main portion for describing depths of grooves.

FIG. 7 is a view of the train wheel bridge 4 as viewed in cross section taken along a line C-C in FIG. 4. FIG. 8 is a view of the train wheel bridge 4 as viewed in cross section taken along a line D-D in FIG. 4. As illustrated in FIG. 7, a cross-sectional shape of the first wide width portion 18 of the first groove 12 is an arc with a radius 27. A cross-sectional shape of the second narrow width portion 22 of the second groove 13 is also an arc with the radius 27. As illustrated in FIG. 8, a cross-sectional shape of the first narrow width portion 19 of the first groove 12 is an arc with the radius 27. A cross-sectional shape of the second wide width portion 21 of the second groove 13 is an arc with the radius 27.

In cross section as viewed in the first direction 15, the cross-sectional shape of the first wide width portion 18 and the cross-sectional shapes of the first narrow width portion 19, the second wide width portion 21, and the second narrow width portion 22 are arcs having the same curvature. The curvature of each cross-sectional shape may have an error corresponding to 20% or less of the radius 27. With such a configuration, by changing a cutting depth in cutting the base material 14 using the same ball end mill, the first wide width portions 18, the first narrow width portions 19, the second wide width portions 21, and the second narrow width portions 22 can be easily formed.

A surface of the first groove 12 and a surface of the second groove 13 may be a satin-finished surface, and a surface of the flat portion 16 may be a mirror surface. The satin-finished surface is a surface on which fine concave and convex portions are formed. The satin-finished surface absorbs light, and the satin-finished surface also irregularly reflects light reflected on the satin-finished surface and hence, even when the satin-finished surface is irradiated with light, the satin-finished surface appears dark. With such a configuration, a contrast difference can be generated in brightness between the first grooves 12 and the second grooves 13 and the flat portions 16. Accordingly, the contrast in brightness of the train wheel bridge 4 is rich in variety and hence, it is possible to enhance the aesthetic appearance of the timepiece component.

The front surface of the base material 14 may be plated. Here, the kind of plating is not particularly limited. Plating such as nickel plating, gold plating, silver plating, blue plating, black plating, or the like may be applied to the base material 14. With such a configuration, the train wheel bridge 4 can change its color tone from a color of the base material 14 and hence, it is possible to increase variation of the color tone of the train wheel bridge 4.

The timepiece 1 includes the train wheel bridge 4. With such a configuration, it is possible to impart a stereoscopic impression to a front surface of the above-mentioned train wheel bridge 4. Accordingly, it is possible to provide the timepiece 1 including the train wheel bridge 4 that can impart the stereoscopic impression to the front surface thereof.

Figure 9:
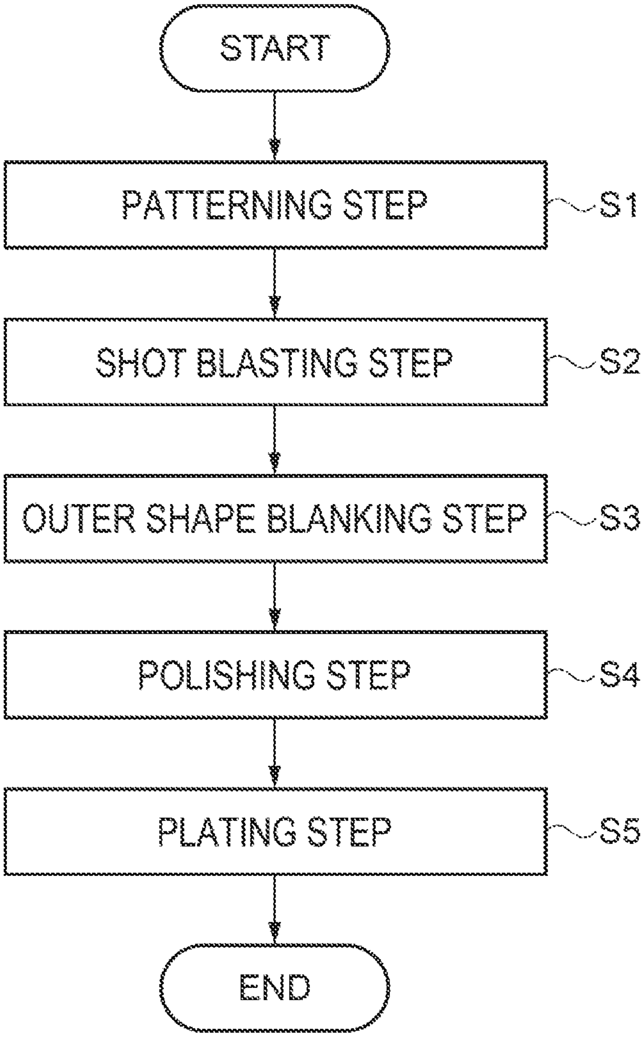
FIG. 9 is a flowchart of a method of manufacturing the train wheel bridge.
Figure 10:
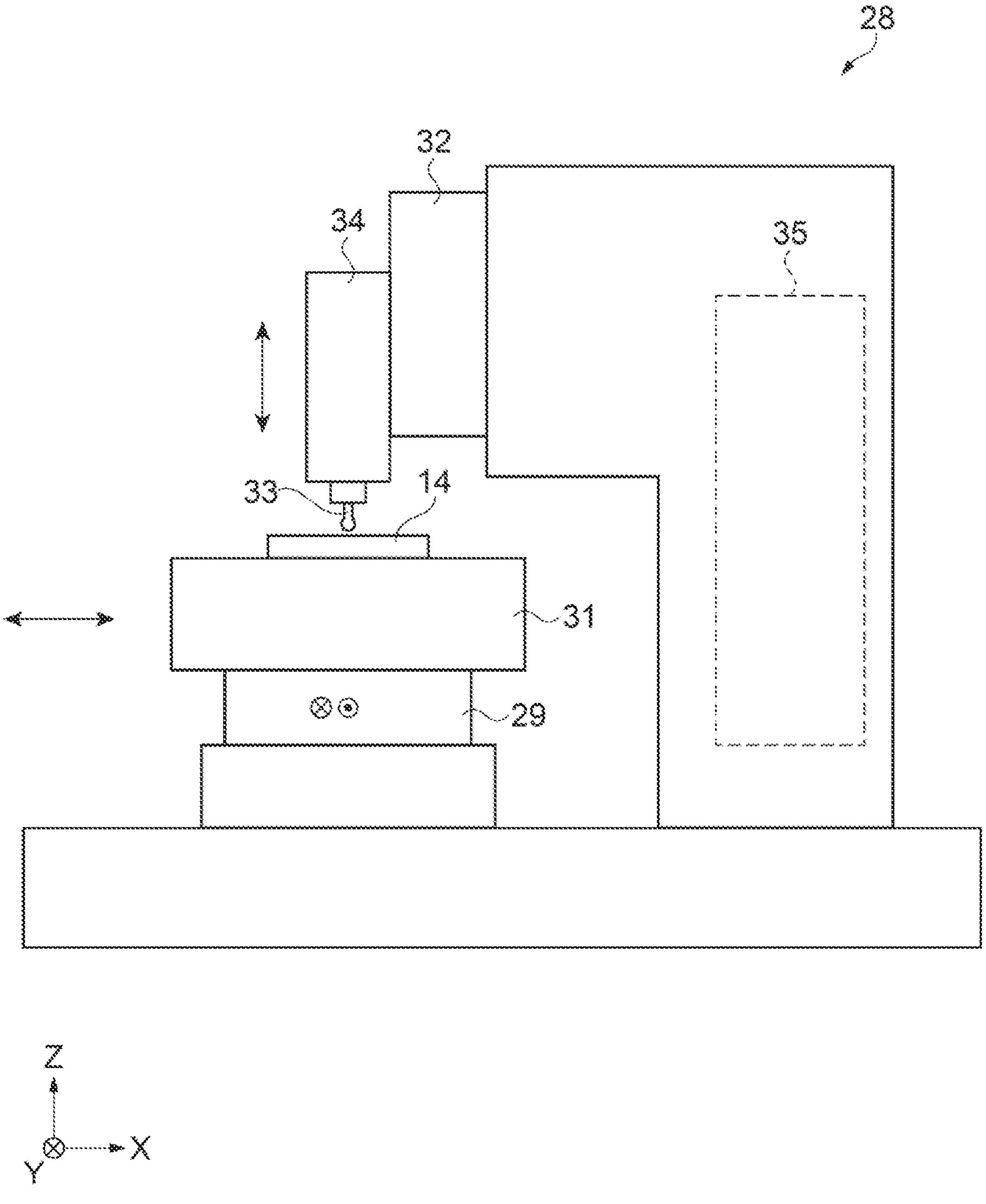
FIG. 10 is a schematic side view illustrating a configuration of a machining center.

Next, a method for manufacturing the above-mentioned train wheel bridge 4 will be described with reference to FIG. 9 to FIG. 11. In the flowchart of FIG. 9, step S1 corresponds to a patterning step, and is a step of forming the first grooves 12 and the second grooves 13 on the base material 14. Next, the processing advances to step S2. Step S2 is a shot blasting step. This step is a step of forming the surfaces of the first grooves 12 and the surfaces of the second grooves 13 into a satin-finished surface. Alumina abrasive particles are blasted to the base material 14. With such blasting, fine concave and convex portions are formed on the front surface of the base material 14 and hence, the surface of the substrate 14 is formed into a satin-finished surface. Next, the processing advances to step S3.

Step S3 is a blanking step. This step is a step of forming an outer shape of the train wheel bridge 4. In addition, holes for installing the bearings 9 and holes for installing the screws 11 are formed in the train wheel bridge 4. A blanking press machine is used as a machine for forming the outer shape and the holes. Next, the processing advances to step S4. Step S4 is a polishing step. This step is a step of forming the surfaces of the flat portions 16 into a mirror surface. The first grooves 12 and the second grooves 13 are masked with a resin material. Next, the base material 14 is buffed. In the buffing, a disc-shaped polishing tool referred to as a buff is coated with a polishing agent, and the buff is pressed to the front surface of the base material 14 while rotating the buff at a high speed. Once the surfaces of the flat portions 16 are finished to be the mirror surface, the mask of the resin is removed. Next, the processing advances to step S5.

Step S5 is a plating step. This step is a step of applying plating to the base material 14. As the plating, electroplating or electroless plating is performed. Due to the above-mentioned steps, the forming of the base material 14 into the train wheel bridge 4 is finished. Then, the train wheel bridge 4 is completed by assembling the bearings 9 to the base material 14.

Next, the patterning step that is step S1 will be described in detail with reference to FIG. 10 and FIG. 11. As illustrated in FIG. 10, a machining center 28 is used in step S1. The machining center 28 includes a Y axis table 29 that is configured to move in the Y axis direction, an X axis table 31 that is configured to move in the X axis direction, and a Z axis table 32 that is configured to move in the Z axis direction.

In addition, the machining center 28 includes a blade tool rotating unit 34 that is configured to clamp and rotate a ball end mill 33 that is a kind of a blade tool. The Z axis table 32 is configured to move the ball end mill 33 in the Z axis direction. In addition, the machining center 28 includes a control unit 35. The control unit 35 is configured to control the movement speed and the movement amount of the Y axis table 29, the X axis table 31, and the Z axis table 32. Further, the control unit 35 is configured to control a rotational speed of the ball end mill 33. The X axis table 31 includes a vacuum chuck, and the base material 14 is suctioned and fixed to the X axis table 31. The X axis table 31 is configured to move the base material 14 in the X axis direction. The Y axis table 29 is configured to move the base material 14 in the Y axis direction.

Figure 11:
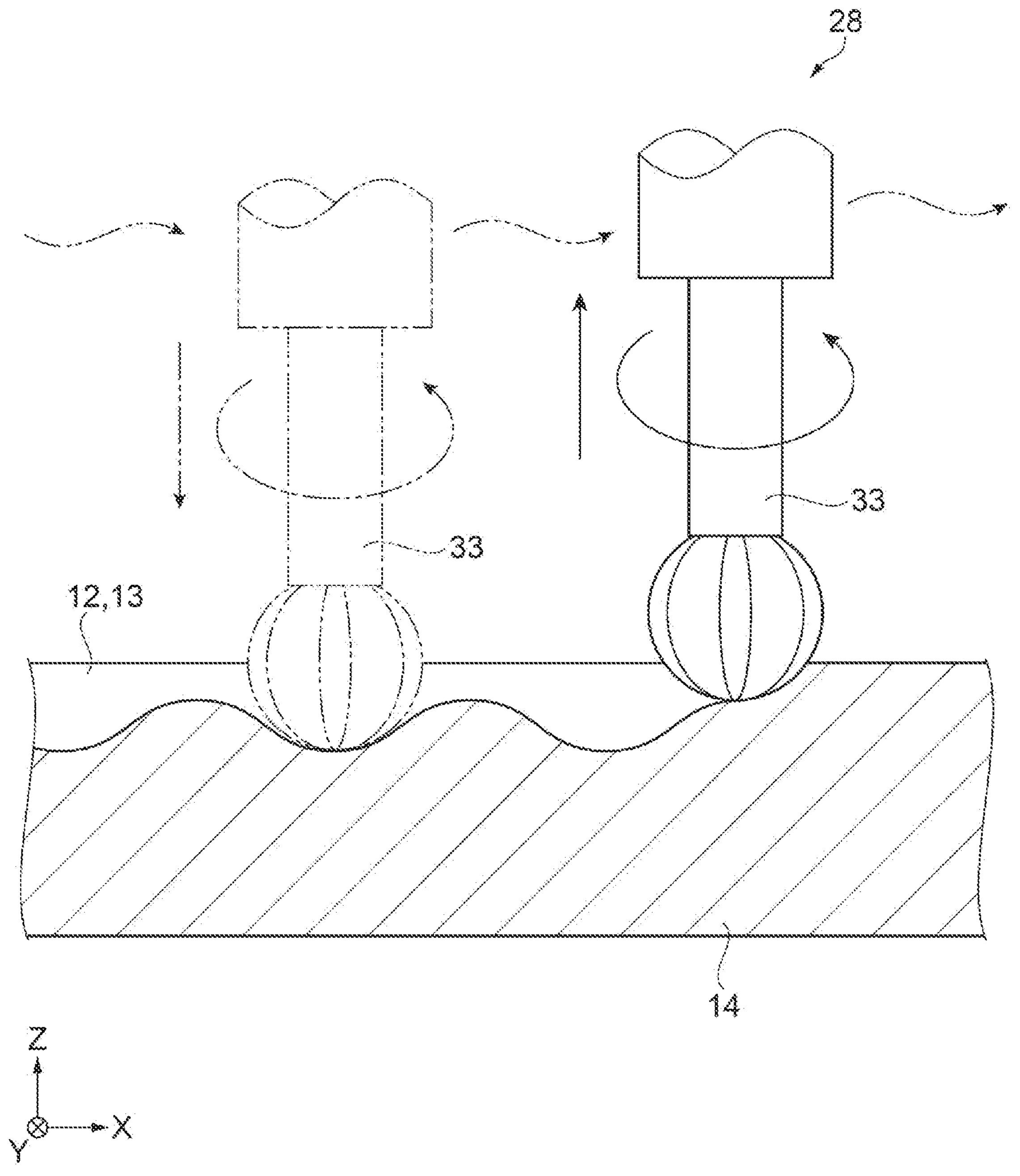
FIG. 11 is a schematic side cross-sectional view of a main portion for describing a grooving method.

As illustrated in FIG. 11, the ball end mill 33 is an end mill including a ball-shaped blade. The control unit 35 simultaneously drives the X axis table 31, the Z axis table 32, and the blade tool rotating unit 34. The machining center 28 moves the ball end mill 33 upward and downward in the Z axis direction while rotating the ball end mill 33. Further, the machining center 28 causes the ball end mill 33 to advance in the X axis direction with respect to the base material 14.

The ball end mill 33 advances while cutting the base material 14. As a result, the ball end mill 33 forms one first groove 12. Next, the control unit 35 drives the Y axis table 29. The Y axis table 29 causes the base material 14 to advance by a predetermined distance in the Y axis direction relative to the ball end mill 33. The predetermined distance is a distance between the center of the first groove 12 and the center of the second groove 13 in the X axis direction.

The ball end mill 33 advances while cutting the base material 14 in the same procedure when the first groove 12 is formed. As a result, the ball end mill 33 forms one second groove 13.

The movement of the base material 14 with respect to the ball end mill 33 by the Y axis table 29 and the formation of the grooves are repeatedly performed. As a result, the plurality of first grooves 12 and the plurality of second grooves 13 are formed in the base material 14 such that the plurality of first grooves 12 and the plurality of second grooves 13 are arranged alternately in the Y axis direction. With such processing, step S1 is finished.

Second Embodiment

Figure 12:
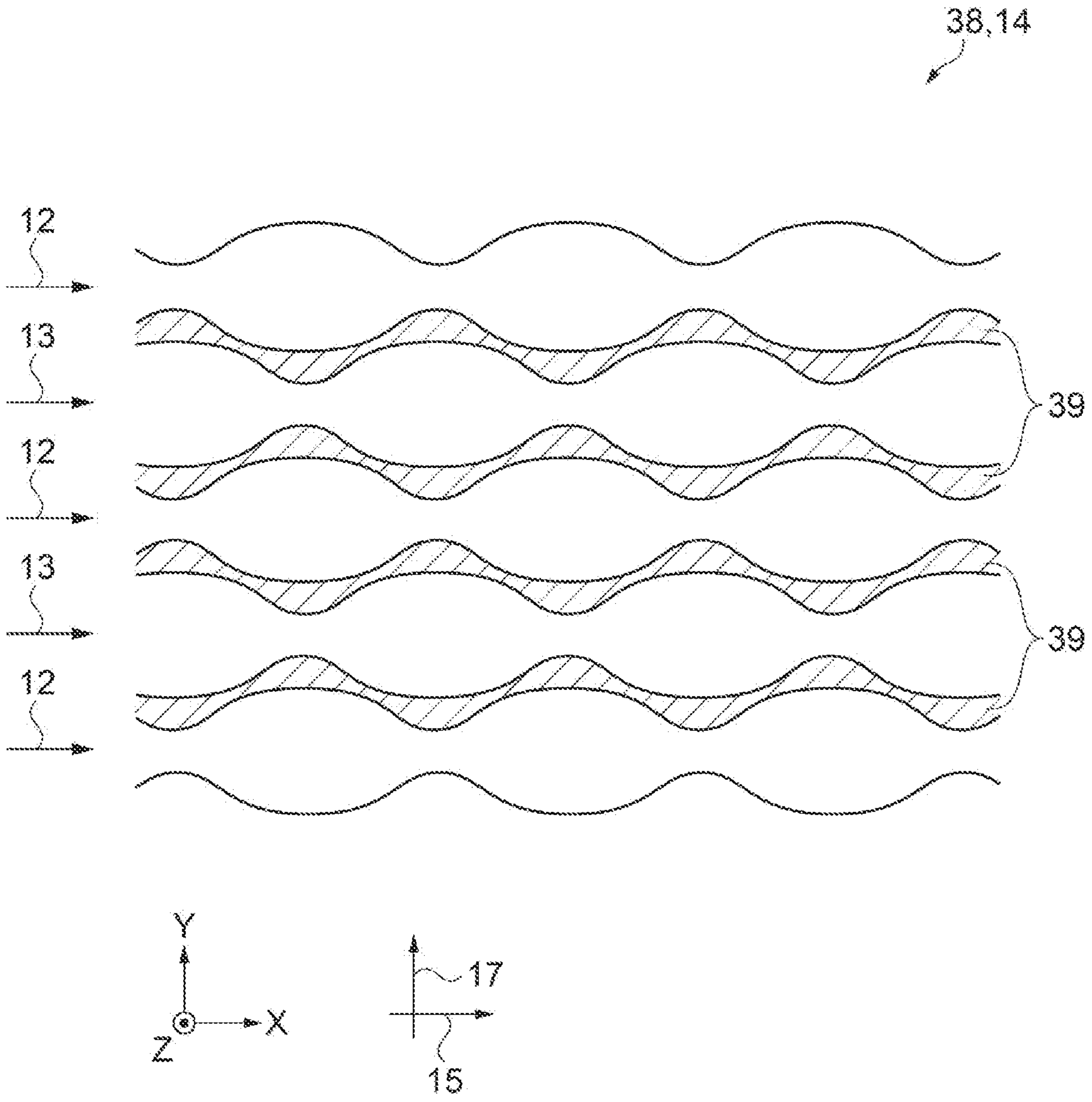
FIG. 12 is a schematic plan view of a main portion for describing a pattern of a train wheel bridge according to a second embodiment.

As illustrated in FIG. 12, in a train wheel bridge 38 as a timepiece component, first grooves 12, second grooves 13, and flat portions 39 respectively extending in the first direction 15 are formed in a base material 14. Surfaces of the first grooves 12 and surfaces of the second grooves 13 are respectively formed in a satin-finished surface, and surfaces of the flat portions 39 are formed in a striped surface. The striped surface is a surface on which a stripe pattern is formed. The stripe pattern is a pattern in which a plurality of fine lines are arranged in a predetermined direction. With such a configuration, a contrast difference can be generated in brightness of the first grooves 12 and the second grooves 13 and the flat portions 39. Accordingly, the contrast in brightness of a train wheel bridge 38 is rich in variety and hence, it is possible to enhance the aesthetic appearance of the timepiece component.

Third Embodiment

In the above-mentioned first embodiment, first grooves 12 and second grooves 13 are alternately arranged in a Y axis direction. The present disclosure is not limited to such a configuration, only the first groove 12 may be formed in a base material 14.

Figure 13:
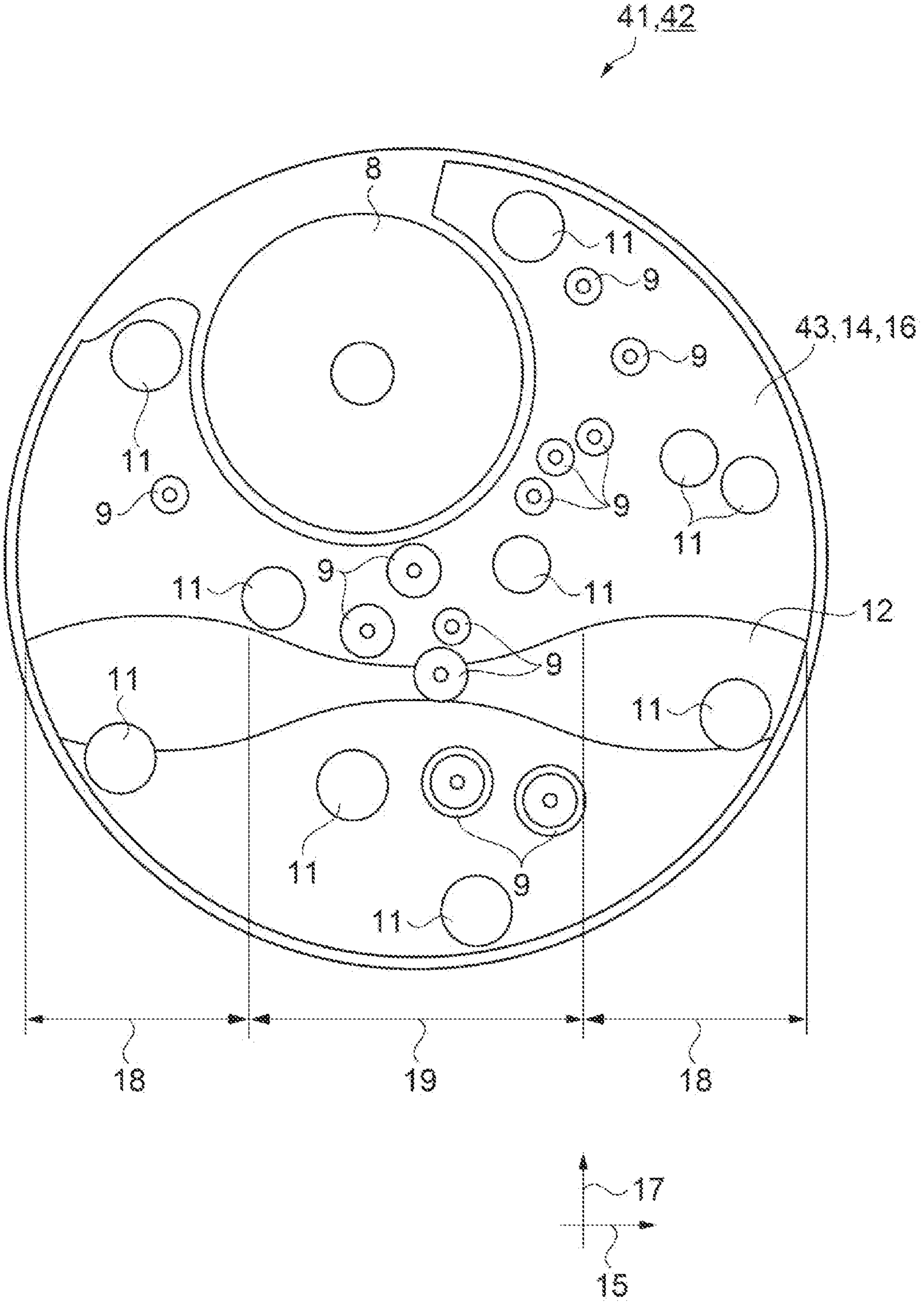
FIG. 13 is a schematic plan view illustrating an external appearance of a train wheel bridge according to a third embodiment.

As illustrated in FIG. 13, a movement 42 of a timepiece 41 includes a train wheel bridge 43 as a timepiece component. The train wheel bridge 43 includes a base material 14 in which the first groove 12 extending in a first direction 15 is formed. In the first direction 15, first wide width portions 18 and a first narrow width portion 19 are alternately provided to the first groove 12. A width of the first wide width portion 18 is wider than a width of the first narrow width portion 19. A depth of the first wide width portion 18 is deeper than a depth of the first narrow width portion 19. In cross section as viewed in the first direction 15, the cross-sectional shape of the first wide width portion 18 and the cross-sectional shape of the first narrow width portion 19 are arcs having the same curvature.

As viewed in plan view of the base material 14, the first groove 12 protrudes toward a flat portion 16 side in the first wide width portion 18. As viewed in plan view of the base material 14, the first groove 12 is recessed in the first narrow width portion 19. The contour of the first groove 12 in contact with the flat portion 16 is smoothly curved.

With such a configuration, the first groove 12 is formed in the base material 14. In the first groove 12, the first wide width portions 18 where a groove width is wide and a groove depth is deep and the first narrow width portion 19 where the groove width is narrow and the groove width is shallow are alternately disposed. Accordingly, regions where the groove depth is deep and a region where the groove depth is shallow are alternately disposed in the first direction 15.

In cross section as viewed in the first direction 15, the cross-sectional shape of the first wide width portion 18 and the cross-sectional shape of the first narrow width portion 19 are arcs having the same curvature. Accordingly, the base material 14 has a shape having unevenness and is formed to have a change in groove depth as viewed in plan view and hence, it is possible to impart a stereoscopic impression to the front surface of the base material 14.

The timepiece 41 includes a train wheel bridge 43. With such a configuration, it is possible to impart a stereoscopic impression to a front surface of the train wheel bridge 43. Accordingly, it is possible to provide the timepiece 41 including the train wheel bridge 43 that can impart the stereoscopic impression to the front surface thereof.

Fourth Embodiment

In the first embodiment, the description has been made by taking a case where the first grooves 12 and the second grooves 13 are formed in the train wheel bridge 4 as an example. In addition, the first groove 12 and the second groove 13 may also be formed in a decorative plate and the like that are disposed on a rotary weight and the dial 5. In addition, the first groove 12 and the second groove 13 may be formed in the dial 5, a case, a band, the barrel drum, and the like. With such a configuration, it is possible to impart a stereoscopic impression to surfaces of the respective members.

What is claimed is:

1. A timepiece component having a front surface on which a pattern is formed and being incorporated in a timepiece, the pattern being visible from an outside of the timepiece, the timepiece component comprising:

a base material in which a first groove, a second groove, and a flat portion are formed on the front surface as the pattern along a first direction, the base material being plate-shaped, wherein the flat portion is provided between the first groove and the second groove in a second direction orthogonal to the first direction, a first wide width portion and a first narrow width portion are alternately provided in the first groove in the first direction, a second wide width portion and a second narrow width portion are alternately provided in the second groove in the first direction, the first wide width portion and the second narrow width portion are alternately provided in the second direction, the first narrow width portion and the second wide width portion are alternately provided in the second direction, a width of the first wide width portion is wider than a width of the first narrow width portion, and a width of the second wide width portion is wider than a width of the second narrow width portion, and a depth of the first wide width portion is deeper than a depth of the first narrow width portion, and a depth of the second wide width portion is deeper than a depth of the second narrow width portion.

2. The timepiece component according to claim 1, wherein in a cross section as viewed in the first direction, a cross-sectional shape of the first wide width portion and a cross-sectional shape of the second wide width portion are arcs having the same curvature.

3. The timepiece component according to claim 1, wherein each of a depth of the first groove and a depth of the second groove is in a range of from 0.05 mm to 0.5 mm.

4. The timepiece component according to claim 1, wherein as viewed in a plan view of the base material, the flat portion has a wide width region and a narrow width region with respect to a width in the second direction.

5. The timepiece component according to claim 1, wherein each of a surface of the first groove and a surface of the second groove are a is a satin-finished surface, and a surface of the flat portion is a mirror-finished surface.

6. The timepiece component according to claim 1, wherein each of a surface of the first groove and a surface of the second groove is a satin-finished surface; and a surface of the flat portion is a striped surface.

7. The timepiece component according to claim 1, wherein the front surface of the base material is plated.

8. A timepiece comprising the timepiece component according to claim 1.

9. A timepiece component having a front surface on which a pattern is formed and being incorporated in a timepiece, the pattern being visible from an outside of the timepiece, the timepiece component comprising:

a base material in which a first groove extending in a first direction is formed in the front surface as the pattern, the base material being plate-shaped, wherein in the first direction, a first wide width portion and a first narrow width portion are alternately provided in the first groove, a width of the first wide width portion is wider than a width of the first narrow width portion, a depth of the first wide width portion is deeper than a depth of the first narrow width portion, in a cross section as viewed in the first direction, a cross-sectional shape of the first wide width portion and a cross-sectional shape of the first narrow width portion are arcs having the same curvature.

10. A timepiece comprising the timepiece component according to claim 9.

* * * * *